United States Patent

Schlipf et al.

[11] Patent Number: 4,859,755
[45] Date of Patent: Aug. 22, 1989

[54] CROSSLINKABLE, FLUORINE-CONTAINING COPOLYMERS AS BINDERS FOR HIGHLY WEATHER-RESISTANT SURFACE COATINGS

[75] Inventors: Michael Schlipf, Burgkirchen; Albrecht Manz, Wiesbaden; Gernot Löhr, Burgkirchen, all of Fed. Rep. of Germany

[73] Assignee: Hoechst Aktiengesellschaft, Frankfurt am Main, Fed. Rep. of Germany

[21] Appl. No.: 141,569

[22] Filed: Jan. 6, 1988

[30] Foreign Application Priority Data

Jan. 10, 1987 [DE] Fed. Rep. of Germany ....... 3700548

[51] Int. Cl.[4] .............................................. C08F 14/18
[52] U.S. Cl. .................................................... 526/255
[58] Field of Search ................ 526/245, 246, 247, 255

[56] References Cited

U.S. PATENT DOCUMENTS 4,151,340  4/1979  Ichimura et al.
4,345,057  8/1982  Yamabe et al.
4,584,343  4/1986  Lohr et al.

FOREIGN PATENT DOCUMENTS 0180962  5/1986  European Pat. Off.

*Primary Examiner*—Joseph L. Schofer
*Assistant Examiner*—N. Sarofim

[57] ABSTRACT

Crosslinkable, fluorine-containing copolymers, comprising:

(a) 15 to 70 mol % of copolymerized units of a vinyl ester of the formula

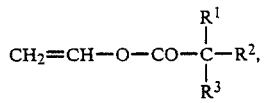

in which $R^1$, $R^2$ and $R^3$ are branched or straight-chain alkyl radicals or cycloalkyl radicals, at most one of these radicals is hydrogen and at least one of these radicals is a methyl group, and where, furthermore, the entire acyl radical of the vinyl ester contains at least 9 and at most 28 carbon atoms, (b) 5 to 50 mol % of copolymerized units of a hydroxyalkyl vinyl ether of the formula

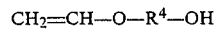

in which $R^4OH$ is a branched or straight-chain hydroxy-alkyl group having 1 to 6 carbon atoms, and (c) copolymerized units of tertrafluoroethylene in an amount which makes up the sum of components (a) plus (b) plus (c) to 100, but with the proviso that at least 10 mol % of copolymerized units of tetrafluoroethylene are present in the copolymer.

From these, highly weather-resistant surface-coating compositions are obtained on addition of crosslinking agents, solvents and conventional additives.

10 Claims, No Drawings

CROSS-LINKABLE, FLUORINE-CONTAINING COPOLYMERS AS BINDERS FOR HIGHLY WEATHER-RESISTANT SURFACE COATINGS

DESCRIPTION

The invention relates to crosslinkable, fluorine-containing copolymers, a process for their preparation, a surface-coating composition which contains these copolymers, and the use of this surface-coating composition.

A large number of coating systems based on fluoropolymers is known. Such coatings are usually applied from dispersions in liquid dispersion media whose particle size extends from relatively coarse-grained down to colloidal particle sizes, the liquid medium being water or an organic solvent or a mixture of the two. Since common fluoropolymers are usually only sparingly soluble or completely insoluble in organic solvents, coatings from solutions, in particular from organic solvents which are conventional in the surface-coatings industry, such as, for example, ethylene glycol esters, methyl isobutyl ketone, toluene, xylene and the like, are encountered relatively seldom.

Coating systems of this type are built up from fluorine-containing copolymers as are known, for example, from U.S. Pat. Nos. 4,151,340 and 4,345,057. The quaterpolymers made from fluorinated olefins, cyclohexyl vinyl ethers, alkyl vinyl ethers and hydroxyalkyl vinyl ethers and described in the lastmentioned publication are open to hardening due to their content of hydroxyl functions.

They produce surface-coating systems which can be hardened even at room temperature on use of isocyanate. However, they are not completely satisfactory with regard to their weather resistance and their pigmenting level (pigment take-up capacity).

In U.S. Pat. No. 4,584,343, surface-coating systems based on fluorinated copolymers are described which are built up from a fluorinated olefin, a hydrolyzable vinyl ester and a chain-branched nonhydrolyzable vinyl ester. In this case, the functional groups required for hardening must be introduced into the copolymer by an additional aftertreatment step.

In the case of functionalized fluorinated copolymers which have been prepared by this process and which carry, as functional groups, OH groups which have been introduced by hydrolysis of vinyl acetate, relatively long hardening times are observed in some cases. The cause of this is, on the one hand, the lower reactivity, compared to primary OH groups, of the secondary OH groups present here, and, on the other hand, crosslinking points which are directly on the polymer structure are subjected to a certain screening.

On use for cold-hardening coating systems, fluorinated polymers having primary OH groups, as described in U.S. Pat. No. 4,345,057, exhibit separation effects during surface-coating consolidation if, as in the case described, this effect is not taken into account by an appropriate choice of comonomer.

European Offenlegungsschrift No. 180,962 describes, inter alia, a fluorinated copolymer comprising 4 monomer components for use as a surface-coating system which can be hardened under mild conditions and which is built up from a fluorinated olefin, a vinyl ester, an alkyl vinyl ether and a vinyl ether having OH groups. According to the abovementioned publication, the proportion of alkyl vinyl ether in this fluorinated copolymer should not be less than a minimum amount of 5 mol %, since, otherwise, the resultant copolymer is obtained only in very low yield. This statement has obviously been transferred from the tested comonomers chlorotrifluoroethylene and hexafluoropropene in a speculative fashion to the likewise mentioned tetrafluoroethylene. However, it surprisingly turns out that, on introduction of tetrafluoroethylene (TFE), the alkyl vinyl ether as the fourth component can be omitted, which causes the reproducibility of the conduction of the copolymerization reaction to be considerably improved without poor yields having to be accepted.

The present invention thus provides crosslinkable, fluorine-containing copolymers which comprise:

(a) 15 to 70 mol % of copolymerized units of a vinyl ester of the formula

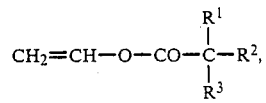

which $R^1$, $R^2$ and $R^3$ are branched or straight-chain alkyl radicals or cycloalkyl radicals, at most one of these radicals is hydrogen and at least one of these radicals is a methyl group, and, furthermore, the entire acyl radical of the vinyl ester contains at least 9 and at most 28 carbon atoms, (b) 5 to 50 mol % of copolymerized units of a hydroxyalkyl vinyl ether of the formula

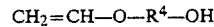

in which $R^4OH$ is a branched or straight-chain hydroxyalkyl group having 1 to 6 carbon atoms, and (c) copolymerized units of tetrafluoroethylene in an amount which makes up the sum of components (a) plus (b) plus (c) to 100, but with the proviso that at least 10 mol % of copolymerized units of tetrafluoroethylene are present in the copolymers.

By using fluorinated copolymers having a monomer composition as described in this invention, problem-free surface-coating consolidation can be achieved even when used for cold-hardening coating systems.

These crosslinkable, fluorine-containing copolymers preferably comprise:

(a) 15 to 55 mol % of copolymerized units of a vinyl ester of component (a) of claim 1, (b) 5 to 40 mol % of copolymerized units of a hydroxyalkyl vinyl ether of component (b) of claim 1, and (c) copolymerized units of tetrafluoroethylene in an amount which makes up the sum of components (a) plus (b) plus (c) to 100, but with the proviso that at least 25 mol % of copolymerized units of tetrafluoroethylene are present in the copolymers.

Component (a) in the copolymers according to the invention is preferably a vinyl ester having branched acyl radicals

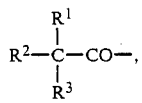

where these acyl radicals (including the CO group) contain 9 to 11 carbon atoms and in which at most one of these radicals is hydrogen and at least one of these radicals is a methyl group.

The branched carboxylic acids on which these acyl radicals are based are accessible by the Koch synthesis from mono-olefins, carbon monoxide and water. The carboxylic acids mentioned are known to those skilled in the art under the names ®Versatic acids or ®Neo acids. The corresponding vinyl esters can be obtained from such branched carboxylic acids by transvinylation using vinyl acetate. However, they are also accessible by the Reppe synthesis through addition of acetylene to the appropriate carboxylic acids.

Suitable hydroxyalkyl vinyl ethers for component (b) of the copolymer are those of the formula $CH_2=CH-O-R^3-OH$, in which $R^4OH$ is a branched or straight-chain hydroxyalkyl group, in particular a hydroxyalkyl group having 1 to 6 carbon atoms. Examples which may be mentioned are hydroxymethyl vinyl ether, 2-hydroxyethyl vinyl ether, 3-hydroxy-n-propyl vinyl ether, 2-hydroxy-n-propyl vinyl ether, 2-hydroxy-1-methylethyl vinyl ether, 4-hydroxy-n-butyl vinyl ether, 3-hydroxy-n-butyl vinyl ether, 2-hydroxy-2-methylpropyl vinyl ether, 5-hydroxy-n-pentyl vinyl ether and 3-hydroxy-n-hexyl vinyl ether. The particularly preferred hydroxyalkyl vinyl ether employed is 4-hydroxy-n-butyl vinyl ether.

Component (c) which introduces the fluorine atoms into the copolymer is tetrafluoroethylene.

It is essential that the crosslinkable, fluorine-containing copolymer according to the invention contains the copolymerized structural units of tetrafluoroethylene, of the vinyl ester of component (b) and of the hydroxyalkyl vinyl ether of component (c) in the ratios specified.

If the content of tetrafluoroethylene units is too low, the advantage of adequate weather resistance is not achieved. If the content of tetrafluoroethylene units is too high, disadvantages with regard to processability and formulation occur. On the other hand, if the content of vinyl ester of component (b) is too low, the solubility of the copolymer according to the invention in typical surface-coating solvents is reduced too greatly and the pigmenting level decreases.

It is furthermore essential that the copolymer according to the invention contains structural units of a hydroxyalkyl vinyl ether in the amount specified; this is in view of the improvement in hardenability without impairment of various other essential properties of a resin for use as a surface-coating binder. If the content of this hydroxyalkyl vinyl ether is too high, the flexibility of the hardened coating is reduced as far as brittleness and the gel-formation time (pot time) of the copolymer in the presence of the hardener is reduced so much that an adequate processing time is no longer ensured. If, on the other hand, the content of these hydroxyalkyl vinyl ethers is too low, the effect of improving the hardening properties is virtually no longer present or not pronounced, meaning that very long hardening times are required and the chemical resistance of the coating is inadequate.

The copolymers according to the invention are prepared in a process in which the vinyl ester of component (a), the hydroxyalkyl vinyl ether of component (b) and tetrafluoroethylene of component (c) are initially subjected to copolymerization, and the polymerization medium and the residual monomer are then removed by distillation or separated off by precipitating the polymer formed. For use as a surface-coating binder, the copolymer thus formed is dissolved in conventional surface-coating solvents.

The polymerization is preferably carried out in organic solvents. Solvents which are suitable for this are, in particular, perfluorinated solvents or solvents which are perhalogenated with fluorine and chlorine, such as, for example, 1,1,2-trichloro-1,2,2-trifluoroethane or perfluorocyclobutane, furthermore also alkanols such as tert.butanol, carboxylates such as, for example, n-butyl acetate or n-propyl acetate, or furthermore aliphatic and cycloaliphatic ketones, for example methyl isobutyl ketone or cyclohexanone.

However, the copolymers according to the invention can also be obtained in the form of colloidal dispersions by the process of emulsion polymerization in the aqueous phase. For this purpose, emulsifiers in an amount of 0.01 to 2% by weight, preferably 0.05 to 0.5% by weight, relative to the amount by weight of the initially introduced aqueous polymerization medium, must be added to the aqueous liquor. In principle, all nonionic and anionic emulsifiers which are suitable for emulsion polymerization of fluorinated olefins and known to those skilled in the art can be employed. Such emulsifiers are the ammonium and alkali metal salts of ω-hydroperfluorocarboxylic acids, of fluoroalkoxypropionic acids, in particular of perfluoropropoxypropionic acid, of perfluoroalkylsulfonic acids and perfluoroalkylphosphonic acids, and, preferably, of perfluorocarboxylic acids having relatively long perfluoroalkyl chains, in particular those having 6 to 12 carbon atoms in the perfluoroalkyl radical. The emulsifiers mentioned can also be employed in the form of their free acids and, if appropriate, neutralized using ammonia, it being possible to simultaneously adjust the pH through the acid:ammonia ratio. Non-fluorinated emulsifiers can also be employed if appropriate. Furthermore, buffer substances, such as, for example, the alkali metal and ammonium salts of oxalic acid, phosphoric acid or acetic acid, can be present, if appropriate, during the copolymerization. It is expedient to carry out the copolymerization in the slightly acidic or in the alkaline region, i.e. approximately at pH 6 to 9.

If the copolymerization is carried out in the form of a solution polymerization, it is likewise expedient to add a basic agent, such as, for example, sodium carbonate or potassium carbonate, and to maintain a slightly alkaline polymerization medium during the entire polymerization.

Finally, the preparation of the copolymers according to the invention can also be carried out by the suspension polymerization process. For this purpose, the slightly alkaline pH which is necessary is produced by adding suitable buffer substances, which usually simultaneously also act as precipitants, such as, for example, ammonium oxalate, borax, ammonium carbonate, ammonium carbamate or ammonium pentaborate, or mixtures of such compounds. It may be expedient to also add a small amount of the abovementioned emulsifiers to the suspension in order to prevent agglomeration and kettle deposits and to achieve a more uniform particle size of the copolymer. The amount by weight of such emulsifiers here is generally less than 150 ppm, preferably less than 50 ppm, relative to the amount by weight of the aqueous liquor initially introduced in the polymerization.

The copolymerization of the comonomers mentioned is initiated in the presence of catalysts which form free radicals. Either hard, high-energy irradiation or water-soluble catalysts which form free radicals, as are known to those skilled in the art in large number for copolymerization of fluorinated olefins, are suitable for the formation of free radicals. Such catalysts are, in particular, peroxidic compounds. Hydrogen peroxide, acyl peroxides such as, for example, diacetyl peroxide, dipropionyl peroxide, dibutyryl peroxide, dibenzoyl peroxide, benzoyl acetyl peroxide, dilauroyl peroxide, disuccinic peroxide or diglutaric peroxide may be mentioned here, but only as examples. In addition, water-soluble peracids, such as peracetic acid, and their water-soluble salts (in particular the ammonium, sodium or potassium salts) or their esters, such as, for example, tert.-butyl peroxyacetate and tert.-butyl peroxypivalate, may be mentioned. The water-soluble salts, in particular the ammonium, potassium and sodium salts of other peracids, such as peroxomono- and peroxodisulfates, perphosphates, perborates and percarbonates may also be employed. Perfluoroacyl peroxides or ω-hydroperfluoroacyl peroxides are furthermore suitable. Certain water-soluble azo compounds represent a further class of catalysts which can be used. The known active redox systems which already generate radicals to an adequate extent at temperatures between 10° and 50° C. can also be employed as catalysts, above all in the low temperature range. Of the redox systems which are known to those skilled in the art for polymerization of fluorinated olefins, the combination of water-soluble peroxidic compounds, preferably peroxodisulfates, with hydrogen sulfite or with disulfite or its addition products with formaldehyde (®Rongalit), with thiosulfate and with diimine-liberating compounds, such as, for example, with hydrazine or azodicarboxamide may be mentioned, but only as example. The salts, preferably the alkali metal salts and, in particular, the ammonium salts, of the compounds mentioned are also present in the redox combinations. If the polymerization takes place in an organic solvent, in each case those of the abovementioned catalysts must be selected which are adequately soluble in the solvent concerned.

In this process, the entire amount of catalyst can be added to the polymerization liquor at the beginning of the reaction. However, it may be expedient in relatively large batches to rinse in the entire amount of catalyst continuously during the course of the polymerization. Equally, part of the amount of catalyst can alternatively be added at the beginning and the remainder in one or more batches can be rinsed in later. The addition of coactivators, i.e. for example, soluble salts of iron and of silver, may be advantageous, in particular when redox systems are used as catalysts.

In order to control the molecular weight and the molecular weight distribution of the copolymer obtained in the desired range, the copolymerization can also be carried out in the presence of a suitable chain-transfer agent, for example methylene chloride or an alkyl malonate.

The copolymerization is carried out at temperatures from 0° to 110° C., preferably from 30° to 90° C., this temperature depending in detail, in particular, on the type of catalyst employed. Tetrafluoroethylene is introduced under pressure during the copolymerization and this pressure is then maintained. It can be in the range from a little above atmospheric pressure (about 1 bar excess pressure) to about 40 bar, but a pressure of 5 to 25 bar is preferably maintained. During solution polymerization, the pressure must in all cases be above the vapor pressure of the solvent at the polymerization temperature used.

In a preferred fashion, about 5 to 30% by weight of the theoretically necessary amount of vinyl ester of component (a) and vinyl ether of component (b) are initially introduced into the polymerization vessel at the beginning of the copolymerization, and the remainder is then added during the copolymerization along with the tetrafluoroethylene. However, it is also possible to initially introduce only part of the amount of vinyl ester of component (a) and to add the remainder of the theoretically necessary amount together with the total amount of vinyl ether of component (b) and the tetrafluoroethylene. Finally, the polymerization can also begin with simultaneous feed of all components (it also being possible for one or more to be premixed with one another), and this feed is continued during the process.

When the polymerization is complete, the polymerization liquor is worked up in a conventional fashion. In the case of precipitation polymerization by the suspension process, the grainy polymer is separated off by conventional separation methods, for example by filtration, sieving or centrifugation. In the case of emulsion polymerization, the colloidal dispersion obtained is coagulated by adding conventional coagulants, such as, for example, electrolyte salts, mineral acids or organic solvents, or alternatively by applying high shear forces, and the coagulate is separated off from the aqueous liquor in a conventional fashion. The moist polymer thus obtained is washed and dried at temperatures from 10° to 70° C., if appropriate with blowing-through of inert gas. In the case of solution polymerization, work-up takes place by distillative separation of the polymer from the polymerization medium and the residual monomers. The molecular weight is $\overline{M}_{rel}=2,000$ to 90,000, preferably 4,500 to 75,000. The molecular weight of the terpolymer according to the invention is determined by gel-permeation chromatography (GPC) in tetrahydrofuran as a relative measurement, relative to a polystyrene standard.

The copolymer according to the invention has an inherent viscosity, measured at 25° C. in tetrahydrofuran, of 0.02 to 1.8 dl/g, preferably 0.03 to 1.6 dl/g, and specifically 0.04 to 1.1 dl/g. If the viscosity is too low, the mechanical strength is inadequate, whereas an excessive viscosity means that the resin concentration in the surface coating must be low in view of the viscosity and furthermore the processability during formulation of readily soluble surface-coating systems produced from such resins is impaired. Solutions of fluorinated copolymers according to U.S. Pat. No. 4,345,057 have a higher viscosity at a comparable molecular weight and a comparable solids content. Since the viscosity of the formulated surface coating is determined by the form of application (brush coating, roll coating, spraying etc.), surface-coating systems based on fluorinated copolymers according to the invention can be more highly pigmented than known surface-coating systems.

The copolymers according to the invention should expediently have a OH number from 25 to 200 mg of KOH/g, preferably 30 to 140 mg of KOH/g.

The copolymers according to the invention obtained in this fashion are readily soluble in a large number of organic solvents, above all in solvents and solvent mixtures which are conventionally used in the surface-coatings industry.

In particular, such solvents are selected from the following groups: aliphatic alcohols having 1 to 8, in particular having 4 to 8, carbon atoms; polyglycols such as ethylene diglycol, ethylene triglycol, propylene diglycol and propylene triglycol; monoethers and diethers of such glycols, such as, for example, ethylene glycol monoethyl ether, ethylene glycol diethyl ether, ethylene glycol monobutyl ether, ethylene glycol dibutyl ether and propylene glycol monomethyl ether; glycol esters or glycol ether esters, such as, for example, ethylene glycol acetate or ethylene glycol acetate ethyl ether, propylene glycol acetate ethyl ether and methyl ether; furthermore alkylated and dialkylated aromatics, such as, for example, xylene and diethylbenzene; ketones, such as, for example, methyl isobutyl ketone, cyclohexanone and isophorone; carboxylates, in particular acetates and propionates of alcohols having 1 to 6 carbon atoms; and finally all mixtures of such solvents, as long as they are homogeneously miscible with one another. The dissolved copolymer: solvent ratio in the mixture can be 95:5 to 5:95, preferably 90:10 to 10:90; surface-coating systems having high binder resin contents can thus be produced.

The copolymer of this invention contains hydroxyalkyl vinyl ether units whose OH groups enable chemical hardening of the surface coating after application. Depending on the choice of crosslinking mechanism, the hardening can take place at temperatures between 10° C. and 300° C., preferably between 20° C. and 250° C.

If the copolymer according to the invention is used for the production of a heat-hardenable surface coating, various hardeners, such as melamine resins, urea resins, polybasic acids and anhydrides and polyisocyanates and masked polyisocyanates can be admixed, a single-component coating system being obtained.

These give coatings which flow extremely well and produce particularly elastic, adherent, corrosion- and weatherstable, in particular water-resistant, primers, topcoats and single-coat finishes. Baking temperatures of at least 80° C. are necessary for hardening of such surface coatings modified with amino resins. The crosslinking reaction can be accelerated by adding an acidic catalyst, such as, for example, p-toluenesulfonic acid or salts thereof.

Typical examples of aminoplasts are condensation products of amino group-carrying compounds, such as, for example, melamine, urea, acetoguanamine or benzoguanamine, and aldehydes, such as, for example, formaldehyde, paraformaldehyde, acetaldehyde or glyoxal, and also products which are obtained by etherification of these condensation products using alcohols. $C_1$ to $C_4$-alcohols are preferably used for this purpose. Examples of these products which may be mentioned are: hexamethyl-etherified methylolmelamine, hexabutyl-etherified methylolmelamine, methyl-butyl-etherified methylolmelamine, methyl-etherified methylolmelamine, butyl-etherified methylolmelamine and isobutyl-etherified methylolmelamine. From the point of view of compatability with the copolymer according to the invention, methyl-etherified methylolmelamine and, in particular here, penta- to hexamethyl-etherified methylolmelamines are preferably to be used.

Typical examples of polybasic acids are acrylic resins having at least two carboxyl groups per molecule, polyester resins having at least two carboxyl groups per molecule and aromatic polybasic acids, such as, for example, trimellitic acid and pyromellitic acid.

Typical examples of polybasic acid anhydrides are succinic anhydride, trimellitic anhydride, pyromellitic anhydride and vinyl polymers having carboxylic anhydride groups.

Typical examples of masked polyisocyanates are obtained when the polyisocyanates known from polyurethane chemistry are protected using conventional masking agents, such as, for example, alcohols, compounds having phenolic OH groups, oximes, lactams, ethyl acetoacetates and N-monosubstituted carboxamides.

If, on the other hand, the copolymer is used for the production of a surface coating in which hardening is to take place as low as room temperature, a non-masked polyisocyanate is used as the crosslinking agent. In this application, the hardening agent is admixed separately before use and a two-component coating system is used.

Typical examples of polyisocyanates are aliphatic diisocyanates, such as hexamethylene diisocyanate, trimethylhexamethylene diisocyanate and tetramethylene diisocyanate; alicyclic diisocyanates, such as xylene diisocyanate, methylcyclohexane 2,4- or 2,6-diisocyanate, isophorone diisocyanate and 4,4'-methylene biscyclohexyl isocyanate; polyisocyanates having a biuret branch, which are obtained by reacting the polyisocyanates mentioned with water; and polyisocyanates having an isocyanurate ring, which are obtained by polymerization of the diisocyanates mentioned.

The isocyanate addition reaction is accelerated by numerous catalysts, those having electron-donor (Lewis bases) or electron-acceptor properties (Lewis acids) being the most important. Tertiary amines, such as, for example, triethylamine, diethylethanolamine, dimethylethanolamine, 1,4-diazabicyclo[2,2]octane and cyclohexyldimethylamine, are active catalysts as Lewis bases. 4-Dimethylaminopyridine, which is known as an acylation catalyst, also catalyzes the isocyanate reaction. Of the catalytically active Lewis acids, tin compounds are the most important. Thus, tin(IV) compounds, such as, for example, dibutyltin dilaurate and dibutyltin diacetate or, tin(II) compounds, such as tin dioctanoate, are thus employed as very active catalysts.

Finally, crosslinking using epoxy resins is also possible and is likewise carried out at elevated temperature and using catalysts, in particular lithium salts and quaternary ammonium salts.

For formulation of the surface-coating systems, all pigments and extenders which are common in the surface-coating industry can be employed, in particular titanium dioxide and iron oxides, but also cadmium sulfide, zinc sulfide, white lead, barium sulfate, pyrogenic silica, bentone and chalk. The binder (i.e. copolymer according to the invention): pigment pigmentation level is in the region of a weight ratio of 1:0.2 to 1:3.0. Furthermore, which are conventional additives for such surface-coating recipes such as, for example, leveling agents, dispersants, wetting agents, UV absorbers or auxiliaries, can be included in order to improve gloss or adhesion.

In the process of mixing the copolymer with the solvent, the pigment and other additives, a very wide variety of customary equipment can be employed for producing the surface coating, for example ball mills, paint shakers, sand mills, jet mills, three-roll mills, compounders and dissolvers.

The surface-coating systems formulated with addition of the crosslinking agents mentioned give coatings which can be applied to a very wide variety of substrates and, depending on the crosslinking component, can be hardened at room temperature or baked at elevated temperatures. Substrates for this are, in particular, metals, such as, for example, iron, steel, aluminum, copper, bronze and brass, but also other hard surfaces such as glass, ceramics, concrete or alternatively wood or plastic surfaces.

Application can be accomplished using all conventional methods, such as spraying, knife coating, brushing, rolling, dipping, flooding, roller-coating or spreading. The surface-coating systems formulated on the basis of the copolymers according to the invention are particularly suitable for industrial baked finishes, above all by the so-called coil coating method, a continuous method for coating metal bands at speeds of 30 to 150 m/min. This method is used to coat, above all, sheets of cold-rolled steel, zinc-plated steel, aluminum and aluminum alloys; or industrial types of steel, nonferrous heavy metals and sheet-metal pretreated by bonderization are also possible for general-purpose industrial finishes.

The coatings obtained from coating agents based on the copolymers according to the invention are distinguished, above all, by an excellent weather resistance, as can be seen, for example, in the so-called "sun test". This test permits assessment of the weather resistance to be made in relatively short times:

Samples are exposed to a xenon lamp for days or weeks in each case for 3 minutes under water and subsequently for 17 minutes when dry, and this rhythm is repeated as often as desired. Under these test conditions, a silicone-modified polyester resin, which is regarded as particularly resistant to yellowing, exhibits the first yellowing and gloss loss after 200 hours, whereas no yellowing and no gloss loss can be seen in the samples which contain the copolymers according to the invention even after 1,000 hours.

Whereas conventional surface-coating systems and coating agents which have been formulated on the basis of fluorine-containing polymers can be homogeneously pigmented only with difficulty, this surprisingly succeeds very easily using the formulations produced on the basis of the copolymers according to the invention.

The copolymers according to the invention are distinguished by high reactivity with crosslinking components of all types, which makes possible rapid and complete hardening. The coatings and films produced from such surface-coating systems exhibit good covering power, smoothness, elasticity, adhesion, surface hardness, a high gloss and chemical and weather resistance.

The invention is illustrated by the following examples:

EXAMPLE 1

20 liters of tert.-butanol, to which 10 g of potassium carbonate have been added, are introduced into a 40 liter kettle. The temperature of the initially introduced medium is adjusted to 30° C., and the container is then freed from oxygen in a conventional fashion by flushing with nitrogen. After pressurizing twice with tetrafluoroethylene (TFE) to 1.6 bar, the liquor is saturated with TFE. After the medium has been heated to 75° C., TFE is pressurized to 10 bar while stirring. The polymerization is initiated by adding bis-(4-tert.-butylcyclohexyl) peroxydicarbonate, dissolved in a monomer mixture comprising an ω-hydroxy-n-butyl vinyl ether (HBVE) and ®Versatic vinyl ester, whose acyl radical is a mixture essentially comprising an acyl component where $R^1=CH_3$, $R^2=C_2H_5$ and $R^3=CH_3(CH_2)_4$—and a further acyl component where $R^1=CH_3$, $R^2=CH_3$ and $R^3=CH_3(CH_2)_5$—. The pressure in the kettle is kept at 10 bar by subsequent addition of TFE, and further monomer mixture is added together with the initiator, corresponding to the consumption of TFE. The subsequent addition takes place continuously and is complete after 2 hours. In total, 1,320 g of TFE, 1,800 g of the vinyl ester mentioned, 810 g of HBVE and 240 g of bis(4-tert.-butylcyclohexyl) peroxydicarbonate are added. The polymerization is complete three-quarters of an hour after completion of the addition of monomer and initiator, when the pressure in the polymerization kettle has fallen to 9.6 bar. A clear product solution having a solids content of 20% is obtained. The residual monomer content is 2.3% of vinyl ester and <0.1% of HBVE. In order to separate the polymerization liquor and the residual monomers, the product solution is subjected to a distillation. The copolymer thus obtained is colorless to slightly yellow. It contains 48 mol % of TFE units, 31 mol % of copolymerized units of the ®Versatic vinyl ester mentioned and 21 mol % of copolymerized units of HBVE. It has a OH number of 86. Its inherent viscosity, measured at 25° C. in tetrahydrofuran, is 0.21 dl/g.

The molecular weight determination by gel-permeation chromatography (GPC) in tetrahydrofuran as a relative measurement, relative to a polystyrene standard, gave a value of $\overline{M}_{rel}=45,000$.

The product is readily soluble in butyl acetate, xylene, in a 2:1 mixture of xylene/methyl isobutyl ketone, in propylene glycol monomethyl ether and in propylene glycol acetate monomethyl ether. The viscosity determination of the 50% strength by weight solutions took place, as conventional for surface coatings, in accordance with DIN 53 211 using a 4 mm flow viscosimeter cup, and gave values between 14 seconds and 63 seconds depending on the solvent and the temperature.

EXAMPLES 2 TO 5

The copolymerization is carried out in accordance with the reaction conditions of Example 1, and the amounts of monomer employed are given in Table 1. The composition of the copolymers obtained and the most important resin properties are also collated in Table 1:

TABLE 1

| Example No. | 2 | 3 | 4 | 5 |
|---|---|---|---|---|
| Amount of monomer employed (g) | | | | |
| TFE | 1760 | 1100 | 1320 | 1320 |
| ®Versatic vinyl ester (as Example 1) | 2400 | 1800 | 2400 | 1800 |
| HBVE | 510 | 1000 | 620 | 810 |
| Copolymer composition (mol %) | | | | |
| TFE | 54 | 47 | 48 | 45 |
| ®Versatic vinyl ester | 33 | 30 | 37 | 31 |
| HBVE | 13 | 23 | 15 | 24 |
| OH number | 53 | 97 | 61 | 76 |
| Inherent viscosity n, (dl/g) | 0.065 | 0.23 | 0.17 | 0.21 |
| $M_{rel}$ | 11000 | 54200 | 37000 | 49000 |

EXAMPLE 6

20 liters of 1,1,2-trichloro-1,2,2-trifluoroethane, to which 15 g of potassium carbonate have been added, are introduced into a 40 liter kettle. The container is then freed from oxygen in a conventional fashion by flushing with nitrogen. The liquor is saturated with TFE by pressurizing twice with TFE to 1.6 bar. After the medium has been heated to 80° C., TFE is pressurized to 10 bar while stirring. The polymerization is initiated by adding bis-(4-tert.-butylcyclohexyl) peroxydicarbonate, dissolved in a monomer mixture comprising ®Versatic vinyl ester, as defined in Example 1), and HBVE. The pressure in the kettle is kept at 10 bar by subsequent addition of TFE, and further monomer mixture, together with the initiator, is added corresponding to the consumption of TFE. The subsequent addition takes place continuously and is complete after 3.5 hours. In total, 1,760 g of TFE, 2,400 g of the vinyl ester mentioned, 510 g of HBVE and 230 g of initiator are added. The polymerization is complete one hour after completion of the addition of monomer and initiator, when the pressure in the polymerization kettle has fallen to 9.8 bar. A clear product solution having a solids content of 13% is obtained, and the residual monomer content is 1.1% by weight of vinyl ester, relative to the polymerization medium, and <0.1% by weight of HBVE. In order to separate the polymerization medium and the residual monomers, the product solution is subjected to a distillation.

The copolymer obtained is colorless. It contains 55 mol % of TFE units, 34 mol % of copolymerized units of ®Versatic vinyl ester and 11 mol % of copolymerized units of HBVE. It has an OH number of 42. The inherent viscosity, measured at 25° C. in tetrahydrofuran, is 0.06 dl/g. The molecular weight determination by GPC gave a value of $\overline{M}_{rel}=10,000$. The product is readily soluble in the solvents mentioned in Example 1. The viscosity of a 50% strength by weight solution in butyl acetate, determined in accordance with DIN 53 211 (4 mm), gives a value of 16 seconds.

EXAMPLE 7

20 liters of tert.-butanol, to which 20 g of potassium carbonate have been added, are introduced into a 40 liter kettle. The temperature of the initially introduced medium is adjusted to 30° C., and the container is then freed from oxygen in a conventional fashion by flushing with nitrogen. The liquor is saturated with TFE by pressurizing twice with TFE to 1.6 bar. A monomer mixture comprising 600 g of a ®Versatic vinyl ester as defined in Example 1, and 333 g of HBVE is then added to the polymerization medium. After the medium has been heated to 75° C., TFE is pressurized to 10 bar while stirring. The polymerization is initiated by adding 50 ml of an initiator solution which is obtained by dissolving 40 g of bis(4-tert.-butylcyclohexyl) peroxydicarbonate in 500 ml of 1,1,2-trichloro-1,2,2-trifluoroethane. The polymerization is continued with simultaneous addition of the remaining amounts of monomers and while keeping the initiator concentration in the polymerization medium constant. The polymerization is complete three-quarters of an hour after completion of the addition of monomer and initiator, when the pressure in the polymerization kettle has fallen to 9.5 bar. In total, 1,540 g of TFE, 1,800 g of the vinyl ester mentioned, 1,000 g of HBVE and 44 g of bis-(4-tert.-butylcyclohexyl) peroxydicarbonate monomers are added. A clear product solution having a solids content of 21% is obtained. The residual monomer content is 1.9% by weight of vinyl ester, relative to the polymerization medium, and <0.1% by weight of HBVE.

In order to separate the polymerization medium and the residual monomers, the product solution is subjected to a distillation. The copolymer thus obtained is colorless. It contains 48 mol % of TFE units, 28 mol % of copolymerized units of the vinyl ester mentioned, and 24 mol % of copolymerized units of HBVE. The OH number is 101. The inherent viscosity, measured at 25° C. in tetrahydrofuran, is 0.16 dl/g.

The molecular weight determination by GPC in tetrahydrofuran gave a value of $\overline{M}_{rel}=34,000$. The product is readily soluble in conventional surface-coating solvents.

EXAMPLE 8

22 liters of demineralized water containing 38 g of perfluorooctanoic acid (neutralized using NH$_3$), 100 g of ®Ronealit (addition product of formaldehyde and sodium dithionite), 20 g of ammonium carbonate and 1 g of Mohr salt in dissolved form are introduced into a 40 liter kettle. The kettle is freed from oxygen in a conventional fashion, and the temperature of the initially introduced medium is adjusted to 45° C. 800 ml of a monomer emulsion comprising 1,900 g of a ®Versatic vinyl ester, as defined in Example 1, 810 g of HBVE, 5 liters of demineralized water and 3 g of perfluorooctanoic acid (neutralized using NH$_3$) and prepared using an ®Ultra-Turrax are now added. A pressure of 10 bar is produced by pressurization with TFE, and the polymerization is initiated by adding 25 g of ammonium persulfate. The remaining monomer emulsion and a further 200 g of ammonium persulfate, dissolved in 2 liters of demineralized water, are added continuously within 3 hours. The polymerization is complete three-quarters of an hour after completion of the addition. A stable dispersion having a solids content of about 12% is obtained. The dispersion is coagulated by acidification using hydrochloric acid. The coagulate produced is washed in demineralized water and subsequently dried. The copolymer thus produced contains 47 mol % of TFE units, 33 mol % of copolymerized units of the vinyl ester mentioned, and 20 mol % of copolymerized units of HBVE. It has an OH number of 79. The inherent viscosity, measured at 25° C. in tetrahydrofuran, is 0.09 dl/g.

The molecular weight determination by GPC gave a value of $\overline{M}_{rel}=19,000$.

The product dissolves readily in conventional surface-coating solvents. The viscosity of a 50% strength by weight solution in butyl acetate, determined in accordance with DIN 53 211 by means of a 4 mm flow viscosimeter cup at 21° C., gave a value of 19 seconds.

EXAMPLE 9

| Mixing in a bead mill | |
|---|---|
| Copolymer from Example 3 (50% strength by weight solution in butyl acetate | 200 g |
| Titanium dioxide (type CL 310) | 122 g |
| | 322 g |
| Surface-coating batch | |
| Bead mill batch as above | 322 g |
| ®Desmodur N 75 (hexamethylene diisocyanate trimer 75% strength by weight solution) | 28.2 g |
| Dibutyltin dilaurate (1% strength by weight solution in xylene) | 200 mg |
| The surface coating is hardened at 20° C. | |

The mixture is applied to a glass plate using an applicator. The coating is subjected to various tests. The results are shown in Table 2.

TABLE 2

| Test | | Result |
|---|---|---|
| Touch setting | | >5 h |
| Tack-free setting | | <24 h |
| Pendulum hardness | 7 d | 69 s |
| Erichsen cupping | 14 d | 9 mm |
| Sun test* | 0 h | 79% |
| | 250 h | 72% |
| | 500 h | 70% |
| | 750 h | 70% |
| | 1000 h | 70% |

*Determination of the surface gloss at 60° mirror reflection (60° C.).

EXAMPLE 10

| | |
|---|---|
| Copolymer from Example 3 (50% strength by weight solution in butyl acetate) | 100 g |
| ®Maprenal MF 900 (pentamethyl-etherified methylolmelamine | 2.63 g |
| para-toluenesulfonic acid | 26 mg |
| Film application | |
| Clear surface coatings, knife application, about 20 to 22 μm dry | 100 μm wet; |
| PMT (peak metal temperature) 224 to 232° C. | |

The mixture is applied to aluminum sheeting (Bonder Al 722). The coating obtained is subjected to various tests. The results are shown in Table 3.

TABLE 3

| Test | Result |
|---|---|
| Acetone test* | >100 |
| Impact | 40 ip |
| T-bend | T 2 |
| Adhesion after T-bend** | 0 |
| Pencil hardness | F |

*Number of wipes (double wipes) until the coating rubs off using acetone-soaked gauze.
**Scale 0 to 5; 0 = best value; visual assessment of adhesion at the T-bend crack produced

EXAMPLE 11

| | |
|---|---|
| Copolymer from Example 3 (50% strength solution in butyl acetate | 100 g |
| ®Additol VXL 9946 (masked aliphatic isocyanate) (25% strength by weight solution in methoxypropyl acetate) | 102.7 g |

Film application

The mixture is applied to aluminum sheeting (Bonder Al 722) as a clear coating:

Knife coating, 100 μm wet; about 20 to 22 μm dry. PMT (peak metal temperature) 224° to 232° C.

The coating is subjected to various tests. The results are shown in Table 4.

TABLE 4

| Test | Result |
|---|---|
| Acetone test | >100 |
| Impact | 40 ip |
| T-bend | T 2 |
| Adhesion after T-bend | 0 |
| Pencil hardness | F-N |

EXAMPLE 12

| | |
|---|---|
| Copolymer from Example 5 (50% strength by weight solution in xylene/methyl isobutyl ketone 1:2) | 100 g |
| ®Maprenal MF 900 (pentamethyl-etherified methylolmelamine | 3.1 g |
| p-Toluenesulfonic acid | 62.5 mg |

Film application

Clear surface coatings, knife coating, 100 μm wet; 20 to 22 μm dry.

Baking conditions: 190° C., 15 min.

The coating is subjected to various tests. The results are shown in Table 5.

TABLE 5

| Test | Result |
|---|---|
| Acetone test | >100 |
| Impact | >100 ip (sheeting crack at 100 ip) |
| T-bend | T 2 |
| Adhesion after T-bend | 0 |
| Pencil hardness | F |

EXAMPLE 13

Use of UV absorbers in combination with cold-hardening fluorinated surface-coating binders:

| | |
|---|---|
| Copolymer from Example 3 (50% strength by weight solution in butyl acetate) | 100 g |
| Dibutyltin dilaurate (1% strength by weight solution in xylene) | 100 mg |
| ®Tinuvin 292 (Ciba Geigy) (sterically hindered amine) | 0.61 g |
| ®Tinuvin 900 (Ciba Geigy) 2-[hydroxy-3,5-di(1,1-dimethylbenzyl)-phenyl]2H—benzotriazole (10% strength by weight solution in xylene | 6.1 g |
| ®Desmodur N 75 (hexamethylene diisocyanate trimer, 75% strength solution | 14.2 g |

Application: spraying: 2 crossed paths=about 25 to 30 μm dry. Hardening takes place at room temperature. The coating is subjected to various tests. The results are shown in Table 6.

TABLE 6

| Test | Result |
|---|---|
| Touch setting | 1 h 40' |
| Tack-free setting | 2 h 10' |
| Pendulum hardness 7 d | 78 s |
| Turbidity* | 1 |

*Scale 0 to 5; 0 = best value.

The following test methods and tests were used in the examples above:

Touch setting corresponds to degree of setting 1 in accordance with DIN standard 53 150 "Determination of the degree of setting of coating materials"

Tack-free setting corresponds to degree of setting 2 in accordance with DIN standard 53 150

| | |
|---|---|
| Konig pendulum hardness | DIN standard 53 157 |
| Cupping | ISO procedure 1520 |
| Impact | ECCA (European Coil-Coater's |

| | |
|---|---|
| Pencil hardness | Association) T5; corresponds to the reference standards ASTM D 2794 - 69 and ISO R 291 ECCA T 4 |
| T-bend | bend test. |

Bend test:

The surface coating is applied to Bonder Al 722 aluminum sheeting. Film thickness wet, 100 μm corresponds to 20 to 22 dry. A 1 cm broad strip this sheeting is kinked with the film on the outside and bent through 180°. This process is repeated (with an increasing bending radius) on the same strip until the film no longer cracks (T0=does not crack in the first bending process; T1 =does not crack in the second bending process, etc.).

We claim:

1. A crosslinkable, fluorine-containing copolymer, comprising:
   (a) 15 to 70 mol % of copolymerized units of a vinyl ester of the formula

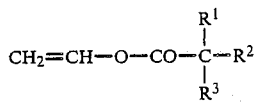

in which $R^1$, $R^2$ and $R^3$ are branched or straight-chain alkyl radicals or cycloalkyl radicals, at most one of these radicals is hydrogen and at least one of these radicals is a methyl group, and, furthermore, the entire acyl radical of the vinyl ester contains at least 9 and at most 28 carbon atoms,
   (b) 5 to 50 mol % of copolymerized units of a hydroxyalkyl vinyl ether of the formula

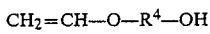

in which $R^4OH$ is a branched or straight-chain hydroxyalkyl group having 1 to 6 carbon atoms, and
   (c) copolymerized units of tetrafluoroethylene in an amount which makes up the sum of components (a) plus (b) plus (c) to 100, but with the proviso that at least 10 mol % of copolymerized units of tetrafluoroethylene are present in the copolymer.

2. A crosslinkable, fluorine-containing copolymer as claimed in claim 1, comprising
   (a) 15 to 55 mol % of copolymerized units of a vinyl ester of component (a) of claim 1,
   (b) 5 to 40 mol % of copolymerized units of a hydroxyalkyl vinyl ether of component (b) of claim 1, and
   (c) copolymerized units of tetrafluoroethylene in an amount which makes up the sum of components (a) plus (b) plus (c) to 100, but with the proviso that at least 25 mol % of copolymerized units of tetrafluoroethylene are present in the copolymer.

3. A crosslinkable, fluorine-containing copolymer as claimed in claim 1, wherein the vinyl ester of component (a) contains an acyl radical having 9 to 11 carbon atoms, where at most one of radicals $R^1$, $R^2$ and $R^3$ is hydrogen and at least one of these radicals is a methyl group.

4. A crosslinkable, fluorine-containing copolymer as claimed in claim 1, wherein the hydroxyvinyl ether is 4-hydroxy-n-butyl vinyl ether.

5. A process for the preparation of a crosslinkable, fluorine-containing copolymer, wherein
   (a) a vinyl ester of the formula

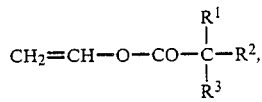

which $R^1$, $R^2$ and $R^3$ are branched or straight-chain alkyl radicals or cycloalkyl radicals, at most one of these radicals is hydrogen and at least one of these radicals is a methyl group, and, furthermore, the entire acyl radical of the vinyl ester contains at least 9 and at most 28 carbon atoms,
   (b) a hydroxyalkyl vinyl ether of the formula

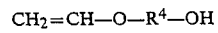

in which $R^4OH$ is a branched or straight-chain hydroxyalkyl group having 1 to 6 carbon atoms, and
   (c) tetrafluoroethylene are copolymerized with one another in amounts such that a copolymer is obtained which comprises
      (a) 15 to 70 mol % of copolymerized units of the vinyl ester mentioned,
      (b) 5 to 50 mol % of copolymerized units of the hydroxyalkyl vinyl ether mentioned, and
      (c) copolymerized units of tetrafluoroethylene in an amount which makes up the sum of components (a) plus (b) plus (c) to 100, but with the proviso that at least 10 mol % of copolymerized units of tetrafluoroethylene are present in the copolymer.

6. A process for the preparation of a crosslinkable, fluorine-containing copolymer as claimed in claim 5, wherein a vinyl ester of component (a), a hydroxyalkyl vinyl ether of component (b) and (c) tetrafluoroethylene are copolymerized with one another in amounts such that a copolymer is obtained which comprises
   (a) 15 to 55 mol % of copolymerized units of the vinyl ester mentioned,
   (b) 5 to 40 mol % of copolymerized units of the hydroxyalkyl vinyl ether mentioned, and
   (c) copolymerized units of tetrafluoroethylene in an amount which makes up the sum of components (a) plus (b) plus (c) to 100, but with the proviso that at least 25 mol % of copolymerized units of tetrafluoroethylene are present in the copolymer.

7. The process as claimed in claim 5 wherein the vinyl ester employed as component (a) contains an acyl radical having 9 to 11 carbon atoms, where at most one of the radicals $R^1$, $R^2$ and $R^3$ is hydrogen and at least one of these radicals is a methyl group.

8. The process as claimed in claim 5, wherein the hydroxyvinyl ether employed as component (b) is 4-hydroxy-n-butyl vinyl ether.

9. A crosslinkable, fluorine-containing copolymer as claimed in claim 1, wherein $R^1$ is $CH_3$, $R^2$ is $C_2H_5$ or $CH_3$ or combinations thereof, and $R_3$ is $Ch_3(CH_2)_4-$ or $CH_3(CH_2)_5-$ or combinations thereof, and wherein the hydroxyalkyl vinyl ether is 4-hydroxy-n-butyl vinyl ether.

10. The process as claimed in claim 5, wherein $R^1=CH_3, R^3=CH_3$ or $C_2H_5$ or combinations thereof, and $R^3CH_3(CH_2)_4-$ or $Ch_3(CH_2)_5-$ or combinations thereof, and wherein the hydroxyalkyl vinyl ether is 4-hydroxy-n-butyl vinyl ether.

* * * * *